United States Patent Office 3,218,025
Patented Nov. 16, 1965

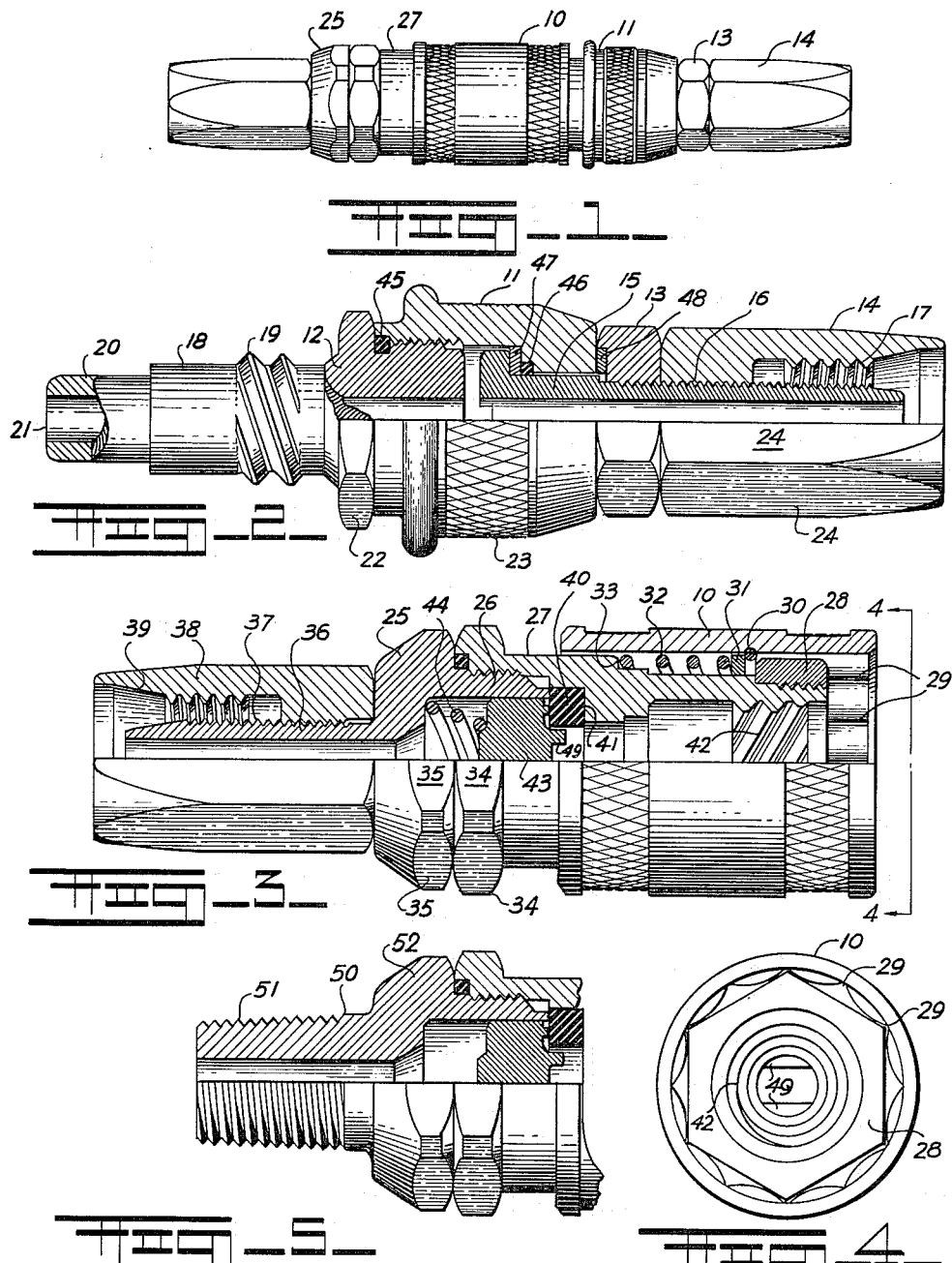

3,218,025
QUICK CONNECT COUPLING
Alvar N. Abelson and Arthur H. Tidd, Aurora, Ohio, assignors to Rose Aviation, Inc., Aurora, Ohio, a corporation of Ohio
Filed Jan. 16, 1963, Ser. No. 251,807
2 Claims. (Cl. 251—149.5)

This invention relates to a quick connect coupling for hydraulic or air lines and particularly those lines that are of a flexible nature such as formed of rubber or synthetic rubber tubing and provided with quick connect couplings between sections thereof.

The principal object of the invention is the provision of a quick connect coupling for an air or hydraulic pressure line that is self-sealing and may be easily connected or disconnected under pressure conditions.

A further object of the invention is the provision of a quick connect coupling that is thread engaged and has a positive lock to prevent inadvertent disconnecting.

A still further object of the invention is the provision of a quick connect coupling that may be connected or disconnected with a simple twist of approximately 180° rotation between the respective parts of the coupling.

A still further object of the invention is the provision of a quick connect coupling incorporating a valve that automatically closes one portion of the coupling when the other portion thereof is disconnected therefrom and which valve is automatically opened when the two portions of the coupling are connected.

The quick connect coupling disclosed herein comprises an improvement in the art of coupling devices that may be connected and disconneted with a relatively small degree of effort such as a rotation of approximately 180° of one part of a coupling relative to the other and which couplings are particularly adapted for connecting sections of compressed air hose or hydraulic pressure hose and wherein one section of the hose comprises a pressure source so that the coupling must be operated under pressure conditions.

The quick connect coupling disclosed herein also incorporates a valve which automatically opens when the two portions of the quick connect coupling are engaged and which valve closes when the two portions of the quick connect coupling are disengaged. The quick connect coupling disclosed herein includes a novel means of insuring against accidental disconnect through the formation of a shroud of a cylindrical nature movable longitudinally of the coupling so as to normally overlie the engaged portions thereof and which shroud has internal configurations registerable with external configurations of the two parts of the coupling which external configurations register with one another when the coupling is engaged.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a plan view of the quick connect coupling in connected position.

FIGURE 2 is an enlarged plan view with the upper half thereof in cross section and with other parts thereof broken away and illustrating the male portion of the coupling.

FIGURE 3 is a plan view on the same scale as FIGURE 2 and with the upper half thereof in cross section and comprising the female portion of the coupling.

FIGURE 4 is an end view on lines 4—4 of FIGURE 3 illustrating the means by which the cylindrical shroud registers with the two portions of the quick connect coupling.

FIGURE 5 is a modified form of the female portion of the coupling seen in FIGURE 3 and wherein the means for attaching this portion of the coupling is different from that illustrated in FIGURE 3.

By referring to the drawings and FIGURE 1 in particular, it will be seen that a quick connect coupling has been disclosed which is particularly suitable for joining air or hydraulic pressure lines, such as rubber hoses or the like, to one another with a pressure-tight quick connect or disconnect action. In FIGURE 1 of the drawings, a coupling body is located beneath a cylindrical shroud 10, the right end of which is slidably positioned over a swivel adapter 11 which is in turn threadably engaged on the coupling body which may be seen by referring to FIGURE 2 of the drawings and wherein the coupling body is indicated by the numeral 12. It will be observed that the swivel adapter 11 abuts a lock nut 13 which in turn adjoins a hose socket 14. The swivel adapter 11, lock nut 13 and hose socket 14 overlie a nipple 15 as may be seen in FIGURE 2 of the drawings, and it will be observed that the outer end portion of the nipple 15 is provided with a thread pattern 16 while the inner surface of the hose socket 14 is provided with a relatively larger secondary thread pattern 17.

Those skilled in the art will observe that the end of a hose positioned between the outer surface of the nipple 15 and the thread pattern 16 thereon and the thread pattern 17 on the inner surface of the hose socket 14 will be effectively secured to this section of the male portion of the quick connect coupling and which section comprises a swivel section relative to the coupling body 12 and swivel adapter 11.

By referring now to FIGURE 2 of the drawings, it will be seen that the coupling body 12 has an extending portion of smaller diameter which is indicated by the numeral 18 and which portion has an external relatively large rapid thread pattern 19 formed thereabout and comprising two convolutions of a thread pattern, while the extreme outermost end of the coupling body 12 is a tubular extension 20 open at its outermost end 21.

Still referring to FIGURE 2 of the drawings, it will be seen that the coupling body 12 has a portion thereof formed in a plurality of radially spaced flat facets 22, 22 to provide means for engaging a wrench thereon and that the exterior surface of the swivel adapter 11 has an annular knurled pattern 23 thereabout, while the exterior of the hose socket 14 has its surface formed in six circumferentially spaced flat planes 24, 24 so that a wrench may be applied thereto if desired, in assembling the quick connect coupling.

By referring again to FIGURE 1 of the drawings, it will be seen that the left half of the quick connect coupling comprises the female portion and includes the cylindrical shroud 10 heretofore disclosed and that this portion of the quick connect coupling may be seen in enlarged detail and in cross sectional elevation in FIGURE 3 of the drawings. This portion of the quick connect coupling includes a secondary coupling body member 25 having an annular threaded extension 26 which threadably receives a tubular housing 27 which with the secondary coupling body 25 defines the receptacle which receives the coupling body 12 and extensions 18 and 20 thereof of the male portion of the quick connect coupling heretofore described in connection with FIGURES 1 and 2 of the drawings. The tubular housing 27 has a lock nut 28 threadably engaged on its exterior surface adjacent its outermost or right end as seen in FIGURE 3 of the drawings and which lock nut 28 serves to provide an exterior configuration of six circumferentially spaced flat facets, the corners of which engage the shaped grooves formed longitudinally in the inner surface of the shroud 10 and which are indicated in FIGURE 3 of the drawings by the numeral 29. A snap ring 30 is seated in an annular groove inwardly of the ends of the interior surface of the shroud 10 and a washer 31 is disposed adjacent thereto to form a support in connection with the snap ring 30 for one end of a coil spring 32 which is positioned about the exterior of the tubular housing 27 and in abutting relation to an annular shoulder 33 thereof. This construction mounts the shroud 10 for longitudinal movement relative to the tubular housing 27 under tension of the coil spring 32. The shroud 10 is normally in the position illustrated in FIGURE 3 at such time as the coupling is disconnected as seen in FIGURE 3 as well as when the two-parts of the coupling are connected as seen in FIGURE 1 of the drawings. The largest diameter of the tubular housing 27 is provided with a plurality of circumferentially spaced flat facets 34, 34 so that a wrench may be applied thereto and a similar configuration is formed circumferentially of the secondary coupling body 25 and wherein the facets are indicated by the numerals 35. The tubular housing 27 has a tubular extension 36, the exterior of which is provided with a thread pattern 37 and a secondary hose socket 38 is threadably engaged on the thread pattern 37 and normally tightly positioned against the secondary coupling body 25 as seen in FIGURE 3 of the drawings and also in FIGURE 1 thereof. It will occur to those skilled in the art that a flexible tube, such as a rubber hose, may have its end portion securely engaged between the thread portion 37 of the extension 36 of the secondary coupling body 25 by reason of a relatively larger thread pattern formed on the interior surface of the secondary hose socket 38 and which thread pattern is indicated by the numeral 39.

Still referring to FIGURE 3 of the drawings, it will be seen that there is an annular gasket 40 between the end of the extension 26 of the secondary coupling body 25 and an oppositely disposed annular shoulder 41 formed on the tubular housing 27 so that these parts may be sealingly engaged. The annular shoulder 41 is located inwardly from the outer end of the tubular housing 27 and there is also a relatively larger fast thread pattern 42 formed on the inner surface of the tubular housing 27 and adapted for threading registry with the thread pattern 19 on the extension 18 of the coupling body 12 of the male portion of the quick connect coupling as heretofore described in FIGURE 2 of the drawings and as illustrated therein.

It will thus be seen that when the male portion of the coupling is engaged in the female portion the secondary extension 20 of the male portion will be positioned against a valve element 43 which is shown in closed position in FIGURE 3 of the drawings but which is normally moved to the left to an open position by the secondary extension 20 when the coupling portions are engaged so as to slightly compress a secondary coil spring 44 which is positioned within the secondary coupling body 25 and normally serves to hold the valve element 43 against the gasket 40 heretofore referred to so that pressure in the flexible tube or rubber hose connected to the secondary coupling body 25 by the hose socket 38 will be effectively controlled.

By referring again to FIGURE 2 of the drawings, it will be seen that the respective movable portions of the male portion of the quick connect coupling are suitably sealed relative to one another. For example, the coupling body 12 and the swivel adapter 11 are sealed at two points thereon by O-rings 45 and 46 respectively, the latter being adjacent a washer 47 which in turn is positioned between oppositely disposed annular shoulders on the nipple 15 and the inner surface of the swivel adapter 11 respectively. A secondary washer 48 is disposed between the lock nut 13 and the end of the swivel adapter 11.

It will thus be seen that when the two portions of the quick connect coupling are engaged as seen in FIGURE 1 of the drawings the secondary extension 20 of the male portion will directly engage the valve element 43 and specifically two raised portions 49, 49 thereon in a manner moving inwardly and thereby opening the same relative to the valve seat defined by the gasket 40 so that communication through the quick connect coupling is established. It will be further seen that at such time as the portions of the coupling are disconnected, the valve element 43 will again seat on the gasket 40 and close the passageway therethrough.

It will further be seen that when the coupling is engaged, the two sections of flexible tubing or rubber hose which are attached to the respective male and female portions of the quick connect coupling may be revolved relative to one another by reason of the swivel formation incorporated in the male portion of the coupling as heretofore described in connection with FIGURE 2 of the drawings.

It will further be seen that when the two portions of the quick connect coupling are engaged as seen in FIGURE 1 of the drawings, the shroud 10 with its longitudinally extending V-shaped grooves 29, 29, as best seen in FIGURE 4 of the drawings, will register with the multiple corners of the lock nut 28 as heretofore described in connection with FIGURE 3 of the drawings, as well as with the multiple facets 22 and more particularly the corners thereof as heretofore described in connection with FIGURE 2 of the drawings. It will be understood that the multiple facets 22 formed on the coupling body member 12 of the male portion of the quick connect coupling correspond in size, shape and configuration and with the circumferential spacing arrangement of the exterior surfaces of the lock nut 29 so that when the same are in abutting relation, the shroud 10 will slide longitudinally thereover and thereby secure the respective male and female parts of the quick connect coupling against accidental disconnecting action. This is possible because the shroud 10 has the longitudinally extending V-shaped grooves on its innermost surface which slidably engage and register with the corners of the lock nut 28 and the facets 22 of the respective male and female portions of the quick connect coupling thereby holding them against relative rotation which is necessary to disconnect these portions relative to one another.

It will occur to those skilled in the art that it may be desirable to attach one of the portions of the coupling to a pressure line or pipe by means other than the hose socket heretofore described, as, for example, in FIGURES 2 and 3 of the drawings wherein the hose socket is indicated by the numerals 14 and 38 respectively. For example, the female portion of the quick connect coupling seen in FIGURE 3 of the drawings may have the hose socket 38 removed completely therefrom and the extension 36 thereof modified as seen in FIGURE 5 of the drawings so that the extension comprises a member 50 of relatively greater thickness and tapering toward its outer end and provided with a pipe thread pattern 51 on its exterior surface. The remainder of the modified structure would be exactly the same as in FIGURE 3 of the drawings and so that the secondary coupling body as indicated in FIGURE 5 by the numeral 52 would correspond with the secondary body 25 of FIGURE 3. Those skilled in the art will thus observe that by substituting the enlarged shortened externally threaded member 50, the female portion of the quick connect coupling may be attached to a pipe line with a regular threaded nipple (not shown) rather than being attached to a section of flexible hose or rubber tube as provided for in the constructions heretofore described in connection with FIGURE 3 of the drawings.

It will thus be seen that a quick connect coupling has been disclosed which possesses the unique advantages of providing a coupling between flexible tubes or rubber hoses as desired or between a rigid and a flexible hose or rubber tube if desired and additionally provides a swivel action at the point of coupling, as well as a valve action open when the coupling portions are engaged and closed when the coupling portions are disengaged, together with a fool-proof positive acting locking means insuring the locking of the two parts of the coupling to one another when they are in engagement in engaged relation.

Those skilled in the art will observe that before the coupling can be disengaged, it is necessary to slide the shroud 10 to the left as seen in FIGURES 1 and 3 of the drawings, partly compressing the coil spring 32 and sufficiently to disengage the extreme right end of the shroud 10 and more specifically the longitudinally extending circumferentially spaced grooves 29 therein from the corners of the facets 22, 22 of the coupling body 12 as seen in FIGURE 2 of the drawings and that the coupling portions cannot be disconnected unless this deliberate longitudinal movement of the shroud 10 is first realized.

It will thus be seen that the quick connect coupling disclosed herein meets the several objects of the invention, and having thus described our invention, what we claim is:

1. In a quick connect coupling including male and female body members having axially extending passageways and wherein said male body member has an axial aligned tubular extension and a fast thread area thereabout engagable in a fast thread area in said female body; a cylindrical shroud positioned on said female body for longitudinal movement relative thereto in co-axial relation to said axial passageway therein and a number of circumferentially spaced, raised formations on said female body slidably engaging some of a greater number of circumferentially spaced longitudinally extending formation-receiving grooves in said cylindrical shroud for preventing relative rotation thereof, said male body having a tubular extension on one end and a number of circumferentially spaced, raised formations adjacent said tubular extension for slidable engagement in some of said grooves in said cylindrical shroud of said female body, said cylindrical shroud having a large number of said grooves arranged to receive said formations on said male and female bodies in many positions and forming means preventing relative rotation of said bodies in any one of said many positions.

2. A quick connect coupling comprising a male coupling body and female coupling body, means on the opposite ends of said bodies for attaching the same to tubular members, said male and female bodies having axial passageways therethrough, a valve seat in said female body and a valve element spring urged against said valve seat and disposed in said female body, a cylindrical shroud positioned on said female body for longitudinal movement relative thereto in co-axial relation to said axial passageway therein and circumferentially spaced, raised formations on said female body slidably engaging circumferentially spaced, longitudinally extending formation-receiving grooves in said cylindrical shroud for preventing relative rotation thereof, said male body having a tubular extension on one end and circumferentially spaced, raised formations adjacent said tubular extension for slidable engagement in said grooves in said cylindrical shroud of said female body, a fast thread section formed exteriorly on said tubular extension of said male body and a matching fast thread pattern formed about an inner annular surface of said female body, said tubular extension of said male body normally engaging said valve element in said female body so as to maintain the same in open relation to said valve seat in said female body and said cylindrical shroud normally engaging said female body and said male body and forming means for preventing relative rotation of said bodies, and wherein there are twice as many longitudinally extending formation receiving grooves in said cylindrical shroud as there are raised formations on said female body and male body.

References Cited by the Examiner
UNITED STATES PATENTS

| | | | |
|---|---|---|---|
| 570,890 | 11/1896 | Baird | 285—275 X |
| 1,580,694 | 4/1926 | Smith | 251—149.4 X |
| 1,851,992 | 4/1932 | Smith | 285—86 |
| 1,968,075 | 7/1934 | Ewald | 251—149.5 |

FOREIGN PATENTS 917,287   9/1946   France.

M. CARY NELSON, *Primary Examiner.*